(12) United States Patent　　(10) Patent No.: US 9,140,891 B2
Novoselov et al.　　(45) Date of Patent: Sep. 22, 2015

(54) ELECTROWETTING DEVICE

(71) Applicant: Liquavista B.V., Eindhoven (NL)

(72) Inventors: Pavel Novoselov, Eindhoven (NL); Toru Sakai, Eindhoven (NL); Daniel Figura, Eindhoven (NL); Andrea Giraldo, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/134,322

(22) Filed: Dec. 19, 2013

(65) Prior Publication Data

US 2014/0104673 A1　　Apr. 17, 2014

(30) Foreign Application Priority Data

Jun. 12, 2012　(GB) ................................. 1210345.3

(51) Int. Cl.
　　*G02B 26/00*　　(2006.01)
(52) U.S. Cl.
　　CPC .................................. *G02B 26/005* (2013.01)
(58) Field of Classification Search
　　CPC .... G02B 26/00; G02B 26/004; G02B 26/005; G02B 2207/115; G09G 3/348
　　USPC ................................................. 359/290–297
　　See application file for complete search history.

(56) References Cited

U.S. PATENT DOCUMENTS

| 7,821,699 | B1 | 10/2010 | Lo et al. |
| 7,852,547 | B2 | 12/2010 | Kim |
| 2001/0017985 | A1 | 8/2001 | Tsuboi et al. |
| 2007/0141218 | A1 | 6/2007 | Chatel et al. |
| 2007/0263306 | A1 | 11/2007 | Hayes et al. |
| 2008/0150867 | A1 | 6/2008 | Miyata et al. |
| 2009/0169806 | A1 | 7/2009 | Lo et al. |

FOREIGN PATENT DOCUMENTS

| CN | 102279464 A | 12/2011 |
| CN | 102346298 A | 2/2012 |
| WO | 03071346 A1 | 8/2003 |
| WO | 2006017129 A2 | 2/2006 |
| WO | 2007141218 A1 | 12/2007 |
| WO | 2009071694 A2 | 6/2009 |
| WO | 2013026877 A1 | 2/2013 |
| WO | 2013087859 A1 | 6/2013 |

OTHER PUBLICATIONS

Ukigaya et al., "In-Plane EPD with an Embedded Collecting Electrode in a Spacer," SID '03 digest, pp. 576-579 (2003).

*Primary Examiner* — Mahidere Sahle
(74) *Attorney, Agent, or Firm* — BainwoodHuang

(57) ABSTRACT

An electrowetting display device comprises a picture element having a first support plate and a second support plate having a space therebetween having a first fluid and a second fluid immiscible with the first fluid. The first support plate comprises a display area, adjoining the space, within which the first fluid is confined and having a first surface adjoining the space. A wall protrudes from the first support plate and is formed outside the display area along a part of the perimeter of the display area. The wall has a second surface facing the display area and adjoining the space. An electrode has a first portion adjacent to the first surface and a second portion adjacent to at least a part of the second surface such that a surface of the second portion including a long side of a cross section of the second portion faces the display area.

25 Claims, 12 Drawing Sheets

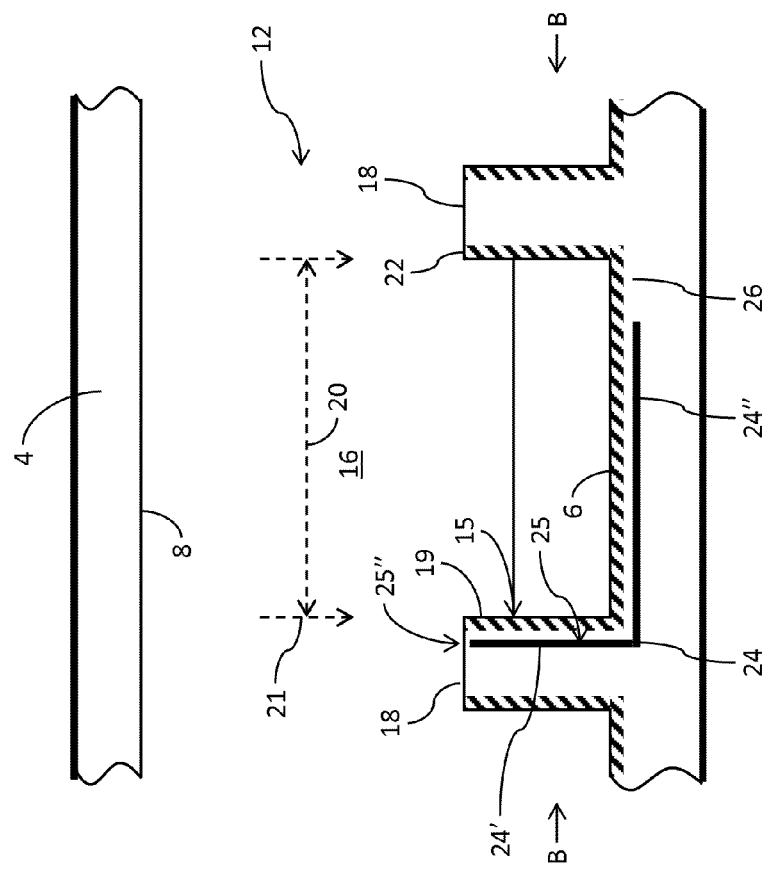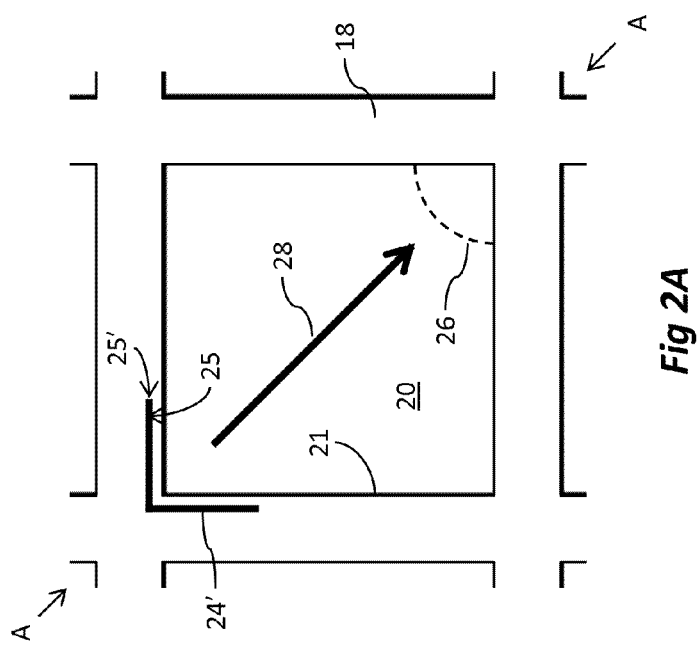

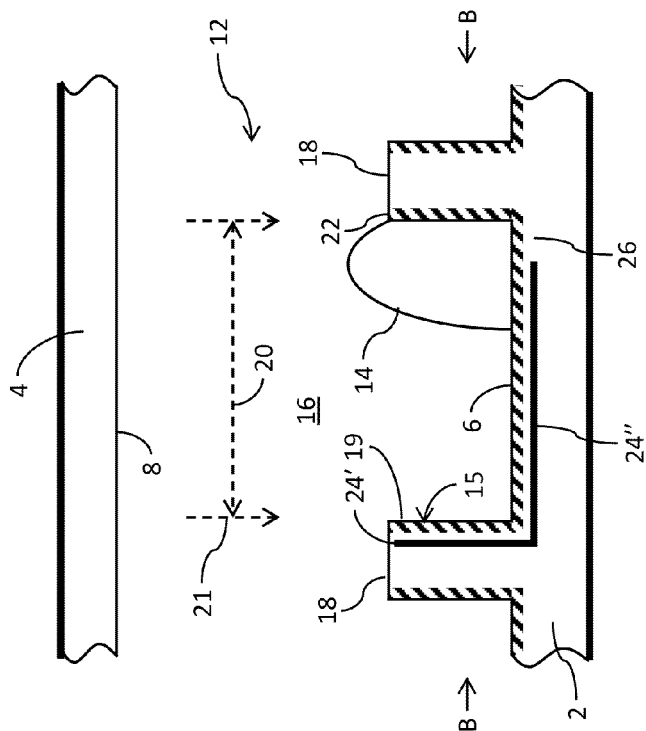
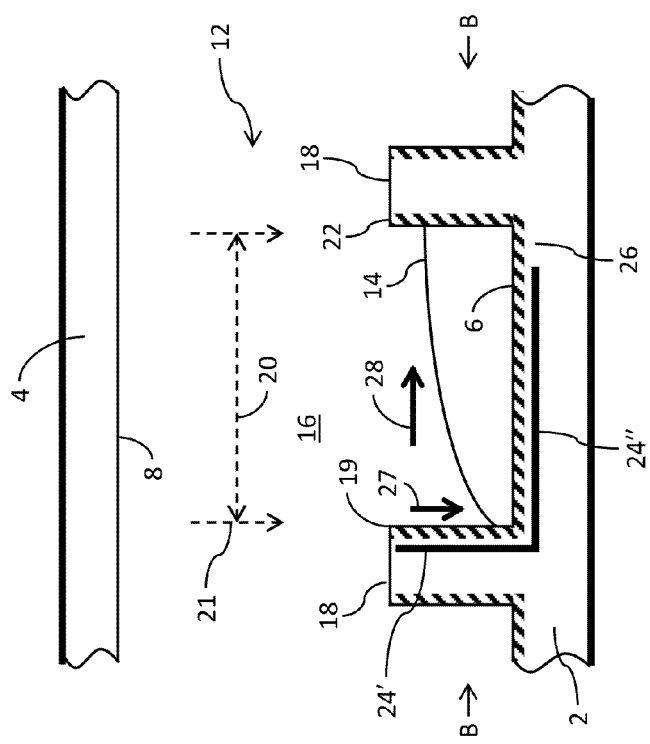

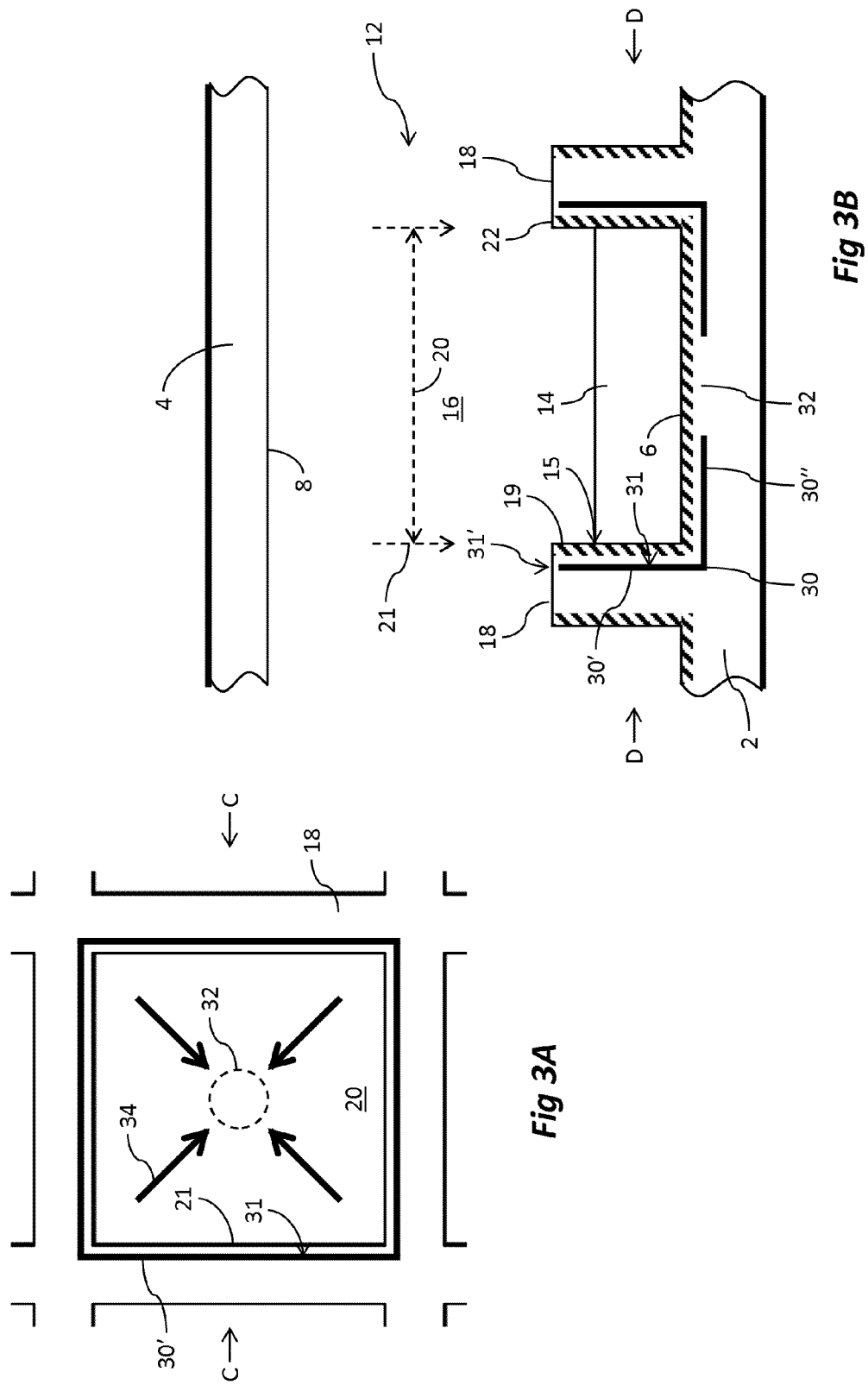

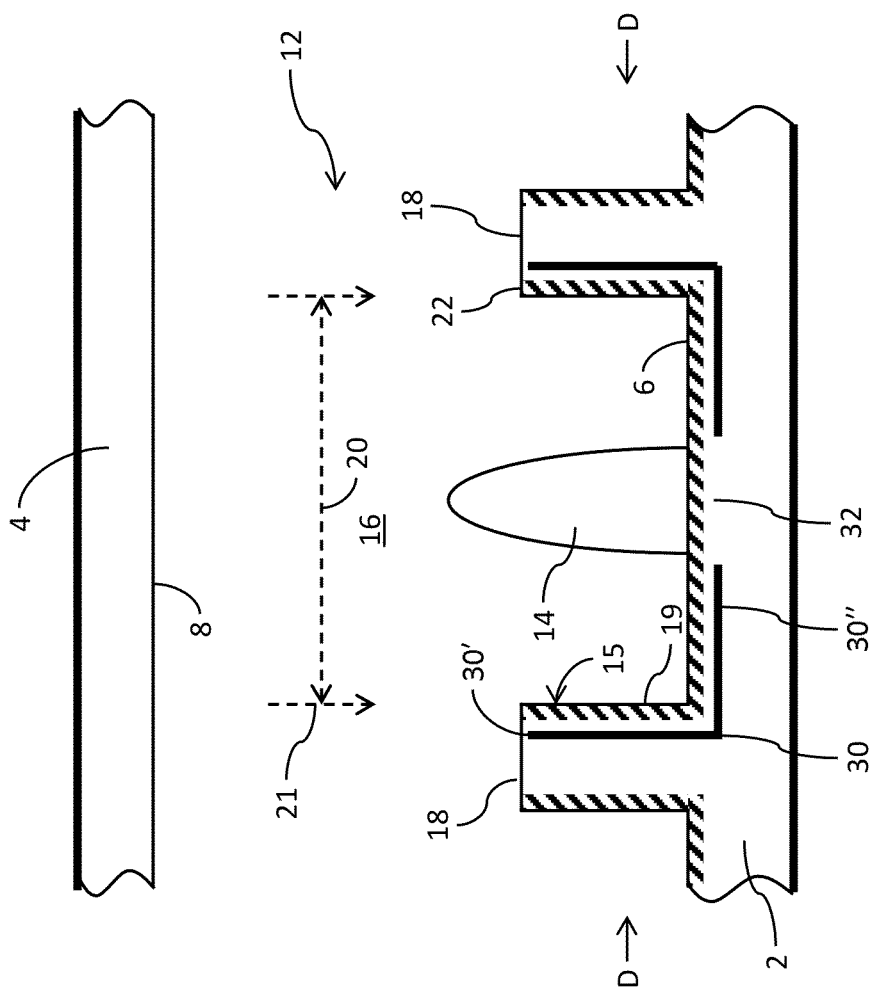

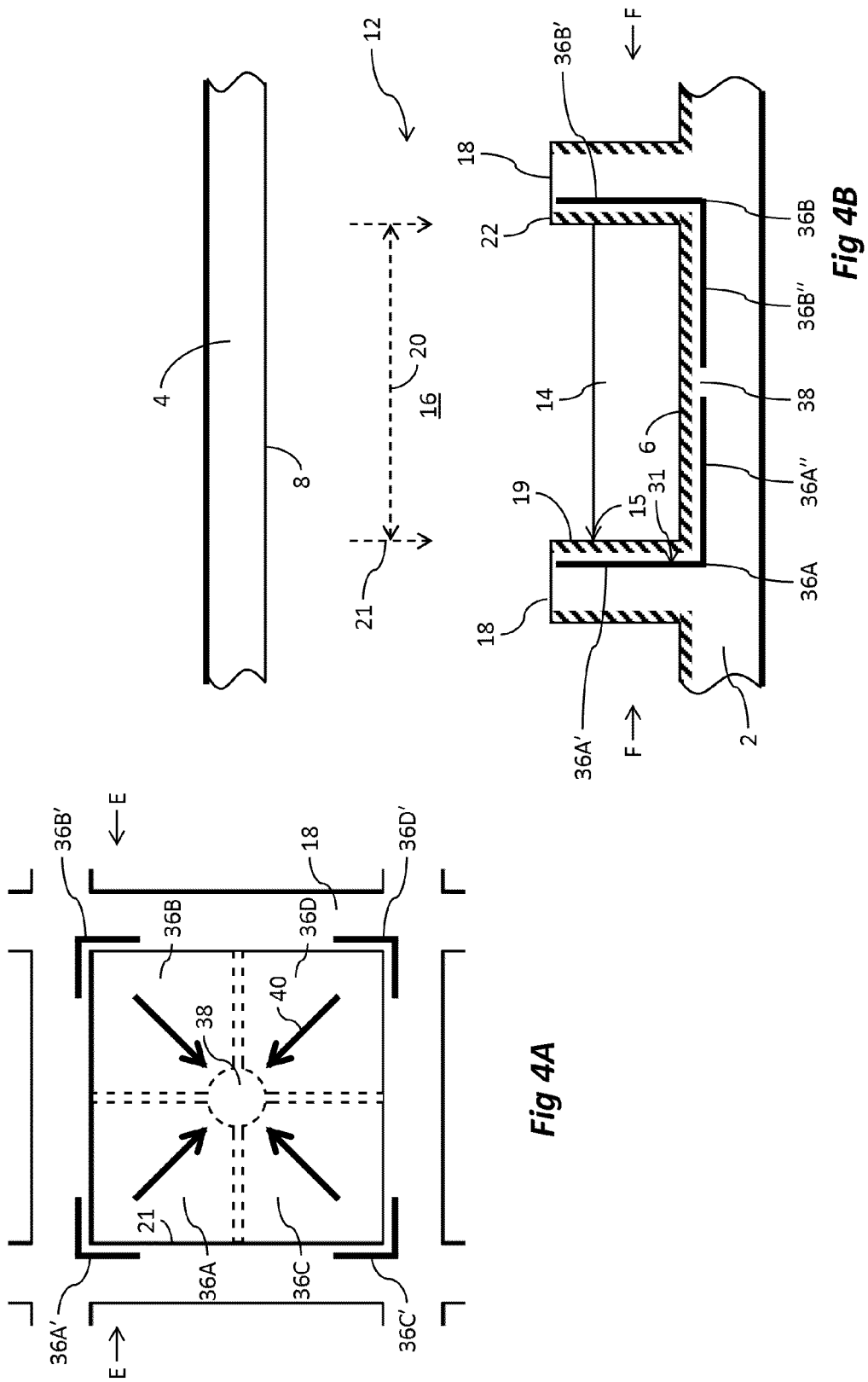

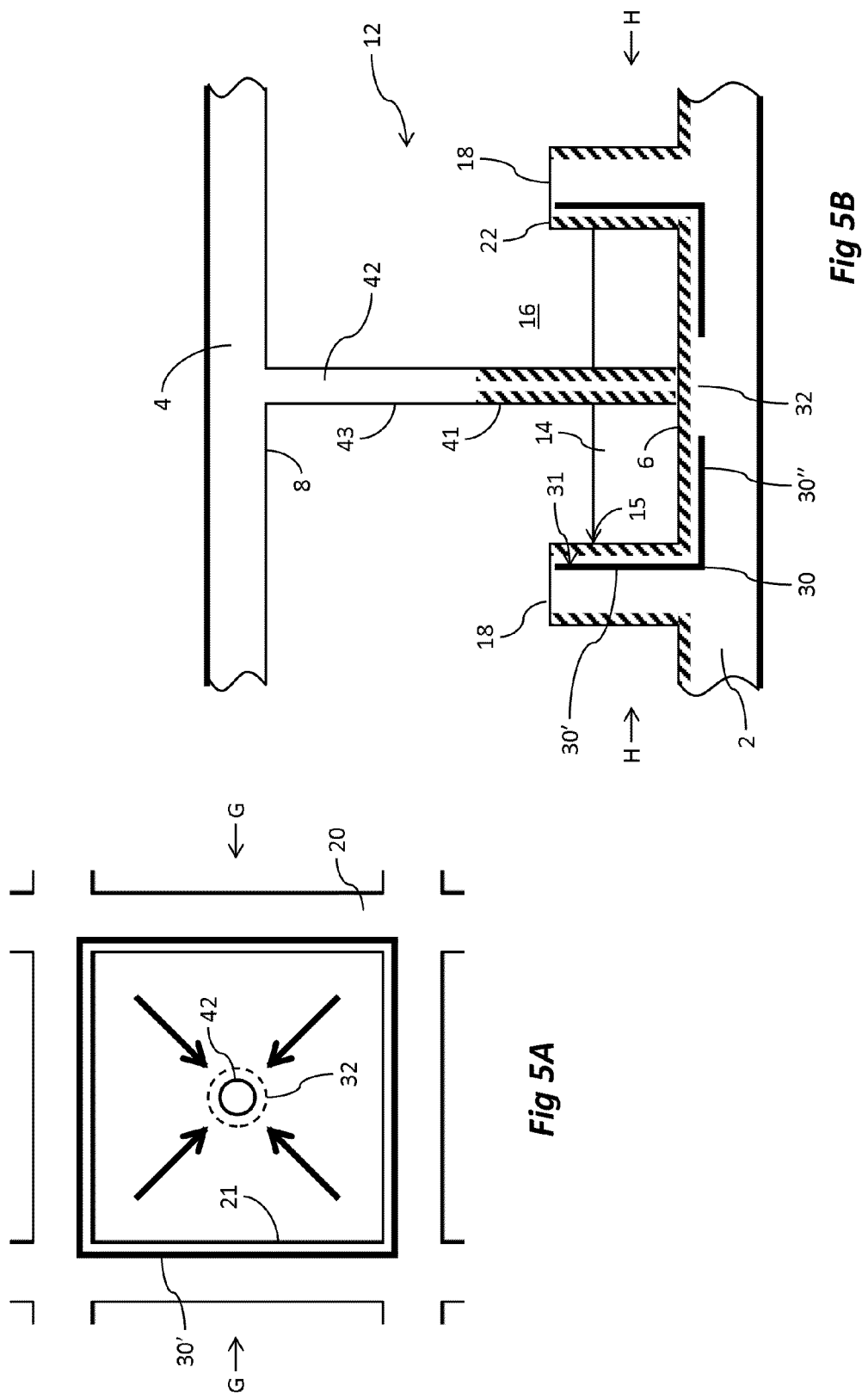

ELECTROWETTING DEVICE

CROSS REFERENCE TO RELATED APPLICATIONS

This application claims the benefit under 35 U.S.C. §120 and §365 of International Application No. PCT/EP2013/062188 filed Jun. 12, 2013, the entire contents of which are incorporated herein by reference.

BACKGROUND

Electrowetting display devices including two support plates are known. One of the support plates comprises a pattern of walls defining the picture elements of the display device. The area between the walls of a picture element is called the display area, over which a display effect occurs.

A space between the support plates contains a first and a second fluid immiscible with each other. The configuration of the walls confines the first fluid within the display area. An electrode is provided in the support plate within the display area. When no voltage is provided between the electrode and the second fluid the first fluid forms a layer over the display area. An application of a voltage changes the configuration of the first and second fluid to provide a display effect.

A problem with this display device is that a relatively high voltage is required to initiate the movement of the first fluid away from the layer configuration. This increases the electrical power required to cause a desired display effect.

BRIEF DESCRIPTION OF DRAWINGS

FIGS. 2A to 2D show schematic diagrams of a picture element according to an embodiment;

FIGS. 3A to 3C show schematic diagrams of a picture element according to a further embodiment;

FIGS. 4A and 4B show schematic diagrams of a picture element according to a further embodiment;

FIGS. 5A to 5c show schematic diagrams of a picture element according to a another embodiment;

Several parts and components of embodiments appear in more than one Figure; for the sake of clarity the same reference numeral will be used to refer to the same part and component in all of the Figures.

DETAILED DESCRIPTION

Figure 1:
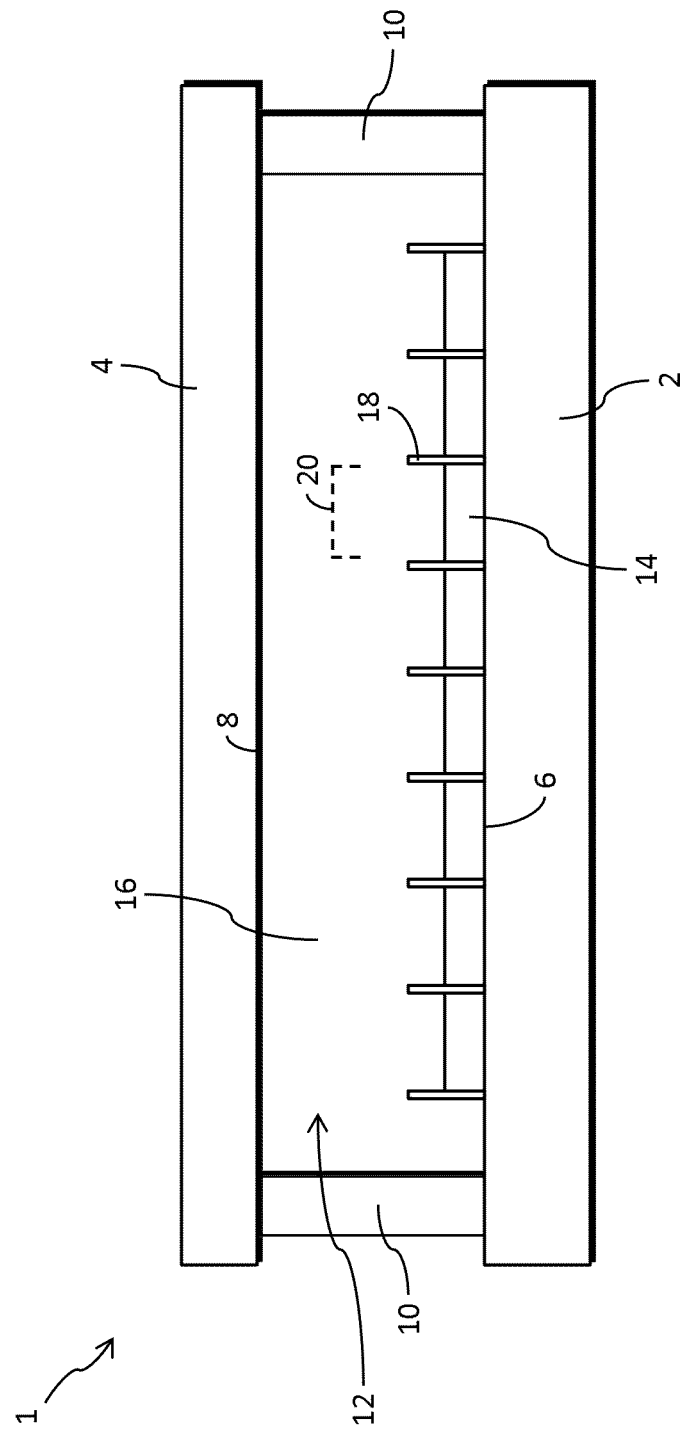
FIG. 1 shows a schematic diagram of a display device.

The entire contents of priority application GB 1210345.3 is incorporated by reference herein.

The present invention relates to an electrowetting device, particularly an electrowetting display device.

Prior to a description of detailed embodiments referencing the figures, embodiments will be described in summary form with descriptions thereof.

In accordance with an embodiment, there is provided an electrowetting display device comprising a picture element, the picture element comprising: a first support plate and a second support plate; a space between the first support plate and the second support plate comprising a first fluid and a second fluid immiscible with the first fluid; wherein the first support plate comprises: a display area, adjoining the space, within which the first fluid is confined, the display area having a first surface adjoining the space; a wall, protruding from the first support plate, formed outside the display area along at least a part of the perimeter of the display area, a side of the wall facing the display area having a second surface adjoining the space; and an electrode comprising at least a first portion and a second portion, the first portion being adjacent to the first surface and the second portion being adjacent to at least a part of the second surface, wherein a surface of the second portion including a long side of a cross section of the second portion faces the display area.

It has been realized that the relatively high voltage required in a known display device to initiate the movement of the first fluid is caused by the need of a relatively strong electric field across the layer of first fluid to enable the second fluid to break through this layer of first fluid. By providing the first support plate with an electrode comprising at least a first portion and a second portion, where the second portion is adjacent to at least a part of the second surface, and a surface of the second portion including a long side of a cross section of the second portion faces the display area, the strength of the electric field, for a given voltage, near the position where the interface between the layer of the first fluid and the second fluid contacts the second surface of the wall at zero applied voltage is increased. As a consequence, a lower voltage is sufficient to initiate motion of the first fluid. Thus the configuration of the first fluid over the display area may be varied using a lower voltage.

Further, in embodiments, a hysteresis effect within the configuration of the first fluid is reduced. In known displays, this hysteresis effect is caused by a relatively high voltage being required to initiate movement of the first fluid. Once the configuration of the first fluid has been changed, a lower voltage is required to maintain the configuration of the first fluid. The second portion of the electrode reduces the voltage required to initiate movement, and thus the difference between the voltage required to initiate movement and the voltage required to maintain a certain configuration, is reduced. This therefore reduces the hysteresis effect.

Where second portion is described as being adjacent to at least a part of the second surface, this means that the second portion is both within a given distance from a part of the second surface, and is present within the volume created by projecting the said part of the second surface along the normal of the part of the second surface. This given distance may be defined as the maximum distance the second portion may be separated from the part of the second surface such that an electric field between the electrode and the second fluid is sufficient to cause the configuration of the first fluid over the display to be changed. This may mean that the second portion of the electrode is separated from the part of the second surface by only a surface layer less than 5 micrometers thickness. The surface layer may be a monolayer of approximately 0.005 micrometers in thickness. The surface layer in this case is a layer which insulates the electrode from the fluid and provides a surface with desired wettability properties to the fluids within the space. The first portion being adjacent to the first surface has a corresponding meaning.

The second portion being adjacent to a part of the second surface may be taken to mean that the electrode is closer to the second surface, i.e. the surface of the side of the wall facing the display area, than to a further surface of the wall opposing the second surface. Where the electrowetting display device comprises multiple picture elements, the wall may extend between two neighboring picture elements; that is, the width of the wall corresponds to the spacing between the perimeter of the display area of one picture element and the perimeter of the display area of a further picture element. In such cases, the second portion being adjacent to a part of the second surface may be taken to indicate that the electrode is within the first 50% of the width of the wall as measured from, and perpendicular to, the second surface. Typically the electrode will be substantially closer to the second surface, being within the first 25% of the width of the wall as measured from, and perpendicular to, the second surface.

It will be apparent that the first and second portion of the electrode are electrically connected so as to be at the same voltage. Thus where a voltage is applied to the electrode, it is applied to both the first and second portions. The first and second portions may be formed of a continuous layer of material.

In some embodiments the first surface and at least a section of the second surface may be more wettable to the first fluid than to the second fluid. The second portion of the electrode may be adjacent to at least a part of the said section of the second surface. The said section of the second surface may extend substantially to an interface line between the first fluid, the second fluid and the second surface when there is zero voltage between the electrode and the second fluid. In the above, where the section of the second surface extends substantially to the interface line, this means that the section is present to within 1 micrometer of the interface line. The section may extend beyond this interface line. By extending the section to the interface line, the change in surface energy of the second surface caused by changes in the voltage on the second portion is increased thus helping to initiate the movement of the first fluid.

In some embodiments, the said section of the second surface may extend to substantially the height of the wall. This means that the section extends from a position contacting the first surface, substantially to the top of the wall, this being the surface of the wall closest to, and facing, the second support plate. Substantially in this case has the same meaning as provided for the given distance above, for example the section may only be separated from the top of the wall by a surface layer of 0.005 up to 5 micrometers. In some embodiments the section may extend to cover some of the top of the wall.

In some embodiments the second portion of the electrode may extend substantially to a position adjacent to an interface line between the first fluid, the second fluid and the second surface when there is zero voltage between the electrode and the second fluid. This means that the second portion is present within the given distance as described above from the interface line. In these embodiments, the second portion may extend to substantially the height of the wall. This means that the second portion is separated from the top of the wall by the given distance as described above. This may mean that the electrode is separated only by a surface layer.

By extending the second portion of the electrode to the interface line, also known as the triple phase line, the electric field between the second portion and the second fluid at this interface line is strong relative to the voltage applied to the electrode, and thus is strong relative to the electric field between the first portion and the second fluid. This strong electric field causes the second fluid to displace the first fluid more easily, starting at the interface line. Consequently, a lower voltage is sufficient to initiate movement of the first fluid. The electrode may be insulated from the first fluid.

In some embodiments the perimeter of the display area may form a polygon, such as a square, a rectangle or a hexagon. The second portion of the electrode may be adjacent to a part of second surface which extends from at least a part of one side of the polygon. Alternatively, the second portion may be adjacent to a part of second surface which extends from at least a part of each of two sides of the polygon adjacent to a first corner of the polygon.

By having the second portion of the electrode adjacent to a part of second surface which extends from at least a part of one side of the polygon or adjacent to a part of second surface which extends from at least a part of each of two sides of the polygon adjacent to a first corner of the polygon the control of the movement of the first fluid is increased. This is because the movement of the first fluid initiates near the second portion, and thus the first fluid will tend to move in a more controlled manner starting in a desired position.

In these embodiments the first portion of the electrode may comprise a hole arranged adjacent to a part of the polygon opposite the second portion. The hole may act as a collection area for the first fluid when a relatively large voltage is present between the electrode and the second fluid. By having the hole positioned adjacent to a part of the polygon opposite the second portion the control of the movement of the first fluid from the second surface towards the hole is increased.

In some embodiments the second surface and second portion of the electrode may be continuous around the perimeter of the display area. In these embodiments, the first portion may comprise a hole at a position adjacent to a part of the first surface spaced from the perimeter of the display area. The above configurations enable controlled movement of the first fluid from the perimeter of the display area to the hole, thus enabling a display device in which the first fluid collects in a portion of the display area spaced from the wall to be constructed. One consequence of this is that the distance moved by the first fluid is relatively short, compared to embodiments in which the fluid moves from one wall to an opposite wall. This improves the switching time of the display.

In some embodiments, the second support plate may comprise a protrusion protruding towards the first support plate. The protrusion may be aligned with the hole in the first portion of the electrode. The protrusion may be configured to contact the first support plate. By providing a protrusion in the second support plate, the display may be made mechanically more robust. By having the protrusion aligned with the hole, any reduction in the contrast of the display caused by the presence of the protrusion is minimized. In addition, the hole may be a relatively large feature; that is, it may have a greater width than other features such as the wall. Therefore, the tolerances required to ensure that the protrusion contacts the first support plate in the appropriate area are relaxed in comparison to arrangements where the protrusion contacts a different, smaller, feature of the first support plate.

In some embodiments, the protrusion may comprise a third surface, at an end of the protrusion near the first support plate, the third surface being more wettable to the first fluid than to the second fluid. Additionally, the protrusion may comprise a fourth surface, at an end of the protrusion near the second support plate, the fourth surface being less wettable to the first fluid than the third surface. By providing these particular wettability properties to the surface of the wall, the first fluid may preferentially collect near the portion of the protrusion near the first support plate. This not only improves the control of the movement of the first fluid but also prevents the first fluid from flowing up the protrusion and escaping the display area.

In some embodiments the wall may extend so as to contact the second support plate.

In some embodiments, the wall may comprise a reflecting portion on the side facing the display area. The second portion of the electrode may form the reflecting portion. In these embodiments, the walls may be reflecting so as to reduce the amount of light incident at slanting angles on the picture element that escapes the display area. Light may be either redirected to the display area or to another optical element of the display itself, such as a color filter or a lens corresponding to the same display area, directly or indirectly by means of another reflective surface in the picture element or external to the picture element. The reflecting material may be formed of a conductive material which is connected to the electrode in the display area, and thereby serves as the second portion of the electrode within the wall. To improve the reflection of light, the height of the wall may be extended so as to contact the second support plate.

It will be understood that the wall as described above has the second portion of the electrode extending within it. One or more further walls with or without portions of the electrode may be present around the whole perimeter of the display area, and serve to confine the first fluid within the display area. It will further be appreciated that the wall may be a curved section, or comprise a plurality of straight sections connected at corners.

In some embodiments, the wall has a further surface facing the second support plate, and the electrode comprises a third portion, the third portion being adjacent to the further surface and wherein a surface of the third portion including a long side of a cross section of the third portion faces the second support plate.

The general characteristics of an electrowetting display device according to embodiments will now be described with reference to FIG. 1.

FIG. 1 shows a schematic cross-section of an electrowetting display device 1 comprising a first support plate 2 and a second support plate 4. The support plates are connected by a seal 10. A space 12 is present between the support plates 2 and 4 and the seal 10. The first support plate 2 has a first surface 6 facing the space 12; and the second support plate 4 has a further surface 8 facing the space 12.

Within the space 12 are a first fluid 14 and a second fluid 16, the first and second fluids being immiscible with each other. The first fluid 14 is electrically non-conductive and may for instance be an alkane like hexadecane or (silicone) oil. The first fluid 14 may be opaque, transparent, colored or white. The second fluid 16 is electrically conductive or polar, and may be water or a salt solution, such as a solution of potassium chloride in a mixture of water and ethyl alcohol. The second fluid 16 may be transparent, colored, white, absorbing or reflecting light.

The first surface 6 of the first support plate 2 comprises a plurality of display areas 20. Walls 18 are formed along the perimeter of the display areas 20. Portions of the first fluid 14 adjoin the first surface 6 within the display areas 20, and each portion is confined within a given display area 20 by the walls 18. Each display area, and part of the support plates below and above the display area, including the walls, constitutes a picture element within the display device 1.

Electrodes (not shown in FIG. 1) associated with a respective picture element are arranged within the first support plate. The position and arrangement of these electrodes will be described in more detail below. At least one further electrode is in electrical contact with the second fluid 16. The display device 1 may be connected to a driving circuit which provides a driving voltage between the electrodes in the first support plate and the further electrode. By varying the voltage between an electrode within the first support plate and the second fluid 16, the second fluid 16 may be made to be attracted to the electrode of the picture element and displace the first fluid 14 within the picture element. A display effect may thereby be created within the display area.

FIGS. 2A, 2B, 2C and 2D show plan and cross section schematic views of a picture element according to an embodiment. FIG. 2B shows a cross section view of the picture element taken along the diagonal line A-A in FIG. 2A. FIG. 2A shows a plan view of the picture element taken along the line B-B in FIG. 2B. FIGS. 2C and 2D show the same view as FIG. 2B, and show the movement of the first fluid 14 on application of a voltage to the electrode.

The display area 20 has a perimeter 21. A wall 18 is formed outside the display area 20 and along at least a part of the perimeter 21. It will be appreciated that the wall 18, as described herein, may form a continuous structure around the perimeter 21. However, in alternative embodiments the wall 18 may be formed as one or more separated structures. It will further be apparent that the wall 18 in the present embodiment is not divided by the corners of the rectangular display area 20. The wall 18 has a second surface 19 facing the display area 20.

The first support plate 2 comprises an electrode 24. A first portion 24" of this electrode is arranged within the display area 20, adjacent to the first surface 6. A second portion 24' of the electrode extends within the wall 18. The second portion 24' is positioned adjacent to a part of the second surface 19 of the wall 18. A surface of the second portion 24' including a long side of a cross section of the second portion 24' faces the display area 20. It will be apparent that the second portion 24' may be substantially planar, and therefore this may be taken to mean that one of the two major surfaces of the electrode faces the display area 20.

Within the display area 20, at least some of the surface of the support plate 2, including at least a section of the first surface 6 and at least a section of the second surface 19, is formed of a material which is less wettable to the second fluid 16 than to the first fluid 14. This material is represented by hatching 22. When the first fluid is oil and the second fluid water, the surface material 22 may be hydrophobic. The wettability properties of the surface material 22 may be obtained by a suitable choice of material, treatment of the surfaces 6 and 19 or application of a layer on the first support plate 2. The surface material 22 may be formed for instance by an amorphous fluoropolymer layer such as AF1600 or another low surface energy polymer. The hydrophobic character causes the first fluid 14 to adhere preferentially to the surface material 22 since the hydrophobic layer has a higher wettability with respect to the first fluid than it has with respect to the second fluid.

In embodiments the second portion 24' and the surface material 22 extend up the wall 18 a sufficient distance for the electrode 24' to be present adjacent to a triple phase line 15 at zero applied voltage. The triple phase line 15 is a line at which the interface between the first and second fluid contacts the second surface 19. At zero applied voltage, when the first fluid 14 forms a layer on the display area, the triple phase line 15 may be close to the top of the wall 18. Therefore, in embodiments, such as the currently described embodiment, the electrode may extend to substantially the height of the wall. However, in view of the above, this is not necessarily the case. An insulating material on the top of the wall may separate the electrode from the conductive second fluid 16.

The top of the wall, that is the part of the surface of the wall which faces the surface 8 of the second support plate 4, may be of the same material as surface material 22. However, to help constrain the first fluid 14 within the display area 20, the top of the wall may be a hydrophilic layer, for example a photoresist material such as SU8. The body of the wall may also be made of a hydrophilic material, such as SU8, on which the electrode and a layer of the surface material 22 are formed.

In both of FIGS. 2A and 2B, a long side of the cross section of the electrode faces the display area. This long side is provided with reference numeral 25. In the cross section of the second portion 24' shown in FIG. 2A, a short side, 25' is shown facing in a direction parallel to the perimeter 21 of the display area, while the long side 25 is shown facing the display area 20. Equally in the cross section of the second portion 24' shown in FIG. 2B, a short side, 25", is shown facing the second support plate 4, while the long side 25 is shown facing the display area 20.

Referring back to FIG. 2A, the second portion 24' of the electrode is adjacent to a part of second surface 19 which extends from at least a part of each of two sides of the rectangular display area 20 adjacent to a first corner. However, as an alternative, the second portion 24' of the electrode within the wall may extend, for example, along part, or the entire extent, of one side of the rectangular display area 20.

The first portion 24" of the electrode extends within the display area 20 adjacent to the first surface 6, with the exception of a hole marked by dashed line 26. The hole 26 represents a part of the display area 20 where the electrode is not present. When there is a potential difference between the electrode 24 and the second fluid 16, there is a comparatively small electric field over the first fluid in the area of the hole 26 due to the absence of the electrode. The effect of this will be described below.

In use, the potential difference between the electrode 24, including the second portion 24' of the electrode located within wall, and the second fluid 16 is varied. Increasing the potential difference, either positively or negatively, will cause the second fluid 16 to displace the first fluid 14. By providing the second portion 24' of the electrode within the wall adjacent to the triple phase line 15 at zero applied voltage, the effective field strength of the electric field is increased at the triple phase line 15. This causes the second fluid 16 to move down the wall 18 and thus displace the first fluid 14 more easily. This decreases the potential difference required to displace the first fluid 14.

Figure 9:
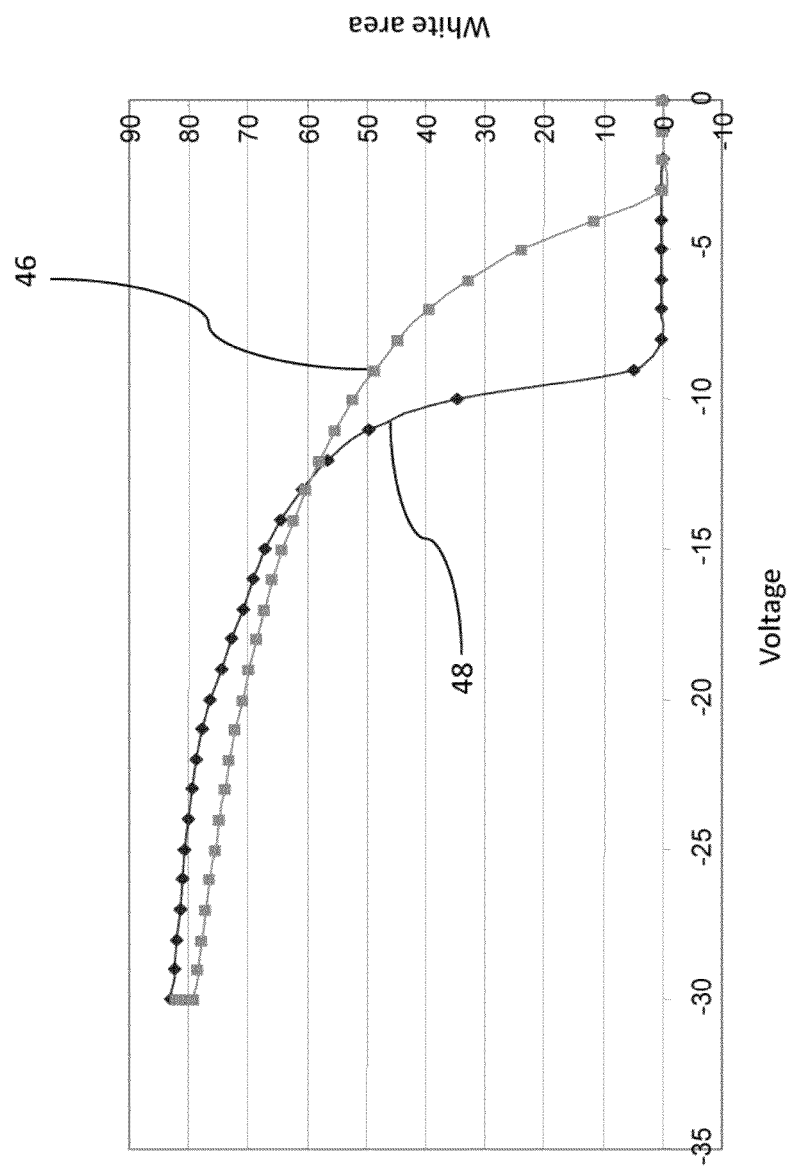
FIG. 9 shows a plot of the percentage white area over display area against voltage applied.

The effect of the second portion 24' in the wall is shown in FIG. 9. FIG. 9 is a plot of voltage against the percentage coverage of second fluid 14 over display area 20. The shallower curve 46 shows the coverage for a picture element according to the embodiments as described above. The steeper curve 48 shows the coverage for a known picture element without the second portion 24' being present in the wall.

It can be seen that the initiation of movement of the first fluid 14 occurs at a significantly lower voltage for picture elements with the electrode within the wall. The reduction in voltage also has the effect of reducing any hysteresis effect in the movement of the first fluid 14.

In the embodiment shown in FIGS. 2A and 2B, the second portion 24' of the electrode within the wall is located at a corner of the rectangular display area 20. This causes the displacement of the first fluid 14 to initiate at that corner when the applied voltage is increased from zero voltage. In addition, the hole 26 creates an area which is relatively attractive to the first fluid 14. The electrode within the wall 24', and in particular the electrode in combination with the hole 26, causes the first fluid to be displaced in a predetermined direction, which is represented by arrow 28.

This movement of the first fluid 14 is shown in FIGS. 2C and 2D. FIG. 2C shows a configuration of the first fluid 14 shortly after a voltage has been applied to the electrode 24. The movement of the first fluid 14 has been initiated at the triple phase line close to the top of the electrode 24' within the wall 18. The strong electric field between the second fluid 16 and the electrode within the wall 24' causes the second fluid 16 to be attracted by the electrode and to move down the wall, as shown by arrow 27. The second fluid 16 displaces the first fluid 14, pushing the first fluid away from the position of the electrode 24' in the wall 18, and towards the hole 26 as represented by arrow 28. FIG. 2D shows a configuration of the first fluid 14 when a voltage higher than in FIG. 2C is present on the electrode 24. The first fluid 14 is now collected in the part of the display area 20 associated with the hole 26.

Positioning of the second portion 24' of the electrode within the wall 18 reduces not only the voltage required to initiate movement of the first fluid 14, but allows a more accurate control of the direction of movement of the first fluid. This enables, amongst other things, a more consistent display effect to be produced in a matrix of picture elements.

An alternative embodiment to that described above in FIGS. 2A and 2B will now be described with reference to FIGS. 3A, 3B and 3C. As with FIGS. 2A and 2B above, FIG. 3A shows a top view and FIG. 3B and 3C show a cross section view. The view of FIG. 3A is taken along line D-D of FIG. 3B and the view of FIG. 3B is taken along the line C-C of FIG. 3A. FIG. 3C shows the same view as FIG. 3B, but with the first fluid 14 displaced.

In the embodiment shown in FIGS. 3A . . . C, the second portion of the electrode extending within the wall, now referenced 30', extends along the entire perimeter of the display area 20. In addition, a hole 32 is provided in the first portion of the electrode 30" in a position spaced from any of the walls. In this particular embodiment the hole 32 is provided substantially in the center of the display area 20.

As with the embodiment shown in FIGS. 2A . . . D, a long side of the cross section of the electrode faces the display area. This long side is provided with reference numeral 31. In FIG. 3B, a short side 31' of the second portion 30' is shown facing the second support plate 4, while the long side 31 is shown facing the display area 20.

The effects of the second portion 30' within the wall 18 and of the hole 32 are similar to those described above. On application of a voltage, the first fluid moves away from the second portion 30', i.e. from all the walls of the picture element and contracts in the center of the picture element, in the area of the hole 32.

Therefore, the second portion 30' causes initiation of the movement of the first fluid 14 towards the hole 32 as indicated by arrows 34. Compared to an arrangement in which no electrode is present within the wall, this embodiment provides increased control over the movement of the fluid. If no electrode were present in the wall of the picture element of FIG. 3A, then the initiation point, that is the point at which the second fluid 16 first displaces the first fluid 14, cannot be controlled accurately. As a result, the desired movement of the first fluid 14 so that it collects in the part of the display area associated with the hole 32 may not occur. Instead the first fluid 14 may collect along an edge, or in a corner of the display area. The movement of the first fluid 14 to the part of the display area associated with the hole 32 is shown in FIG. 3C.

A third embodiment will now be described with reference to FIGS. 4A and 4B. The view of FIG. 4A is taken along line F-F of FIG. 4B and the view of FIG. 4B is taken along the line E-E of FIG. 4A. Again, this embodiment shares many features in common with the embodiments described above. In this embodiment, the display area 20 comprises four separately drivable electrodes, 36A, 36B, 36C and 36D. Each electrode has corresponding first portions, of which first portions 36A" and 36B" are shown in FIG. 4B, and second portions extending within the wall 18, these parts being referenced 36A', 36B', 36C' and 36D' are shown in FIG. 4A. In FIG. 4A, the extent of the electrodes in the display area is represented by dashed lines. As with the embodiment described in FIGS. 3A and 3B, a hole 38 is provided in the center of the display area 20.

In operation, each of the electrodes 36A, 36B, 36C and 36D, along with the corresponding second portions within the walls, 36A', 36B', 36C' and 36D' may be provided with different voltages. Therefore, this embodiment is able to provide four zones within the display area 20, corresponding to the four electrodes, over which the display effect may be, at least partially, independently controlled. Each zone may provide a different display effect, e.g. by providing different color filters in each zone.

In such embodiments, the second portions 36A', 36B', 36C' and 36D' may be provided in the corners of the display area. This ensures that the point of initiation of movement of the first fluid 14 for a given display zone is separated as far from the other display zones as possible. This reduces any interference between the zones, maximizing the independence of the display effects in each of the zones. Without the electrode within the wall, the initiation point may not be so easily controlled, and movement for one zone may start, for example, in the center of the display area, thereby affecting all the other zones in the display area.

Figure 5C:
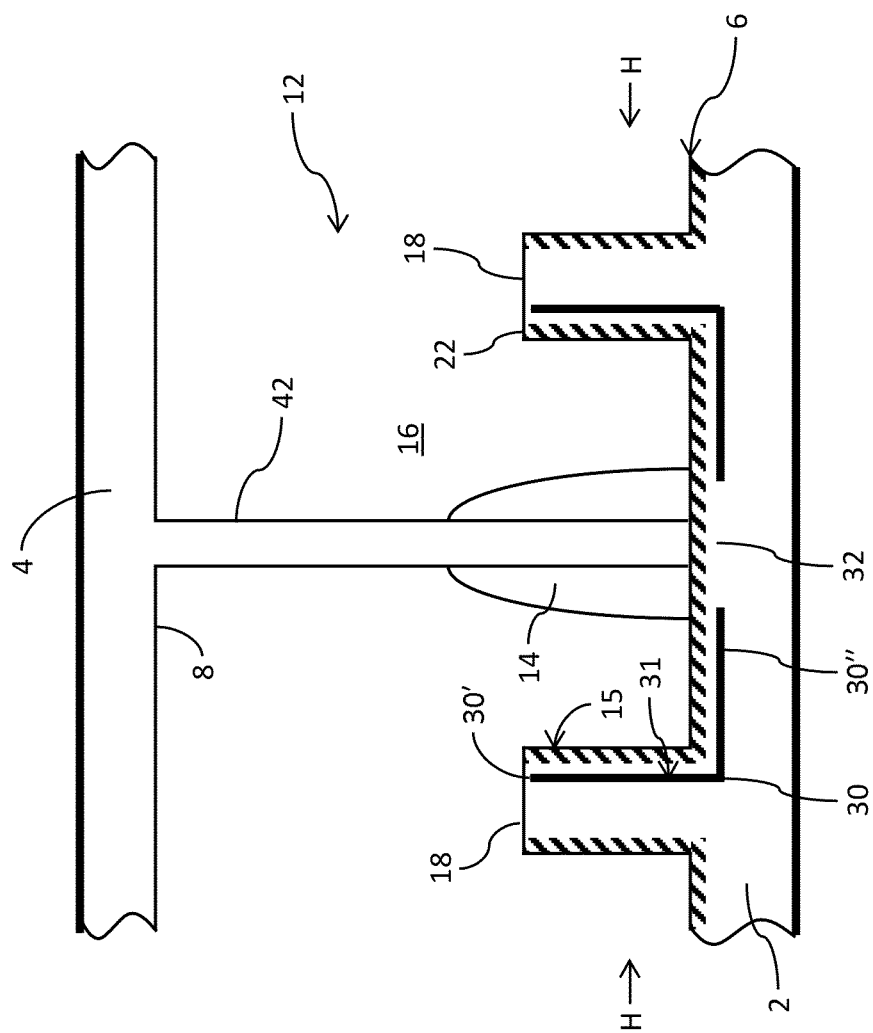

A fourth embodiment is shown in FIGS. 5A, 5B and 5C. The view of FIG. 5A is taken along line H-H of FIG. 5B and the view of FIG. 5B is taken along the line G-G of FIG. 5A. FIG. 5C shows the same view as FIG. 5B, and shows the movement of the first fluid 14 on application of a voltage to the electrode. This embodiment is similar to the embodiment shown in FIGS. 3A and 3B, in that the second portion 30' of the electrode within the wall extends around the perimeter of the display area 20. As with FIGS. 3A and 3B, the electrode is indicated by reference 30, the first portion of the electrode is indicated with reference 30", and the second portion of the electrode within the wall is indicated by reference 30'. A hole 32 is provided within the electrode 30, spaced from the wall, and in this embodiment in the center of the display area 20.

In addition, the second support plate 4 comprises a protrusion 42 which extends towards the first support plate 2. The protrusion 42 is aligned with the hole 32. The protrusion may contact the surface 6 of the first support plate 2, or alternatively may be spaced from the surface 6. The surface of the protrusion may be hydrophobic or hydrophilic, or a combination of both. In the embodiment shown, the protrusion has a third surface 41 near the first support plate 2 which is hydrophobic, and a fourth surface 43 which is near the second support plate 4 which is hydrophilic.

In some situations, for example when a user exerts pressure on a display device, the first and second support plates are forced together, reducing the size of the space in the vicinity of the applied pressure. This can cause, amongst other things, a wave propagating within the second fluid, and may force a portion of the first fluid 14 in a given display area 20 into a neighboring display area. This may be detrimental to the quality of displayed images. The protrusion 42 increases the mechanical robustness of the display, and in particular the protrusion 42 reduces the amount by which the space 12 may be reduced in size under pressure. This therefore reduces the likelihood of the detrimental effects described above from occurring.

In addition, since the protrusion 42 is aligned with the hole 32, the protrusion 42 is located in a position at which the first fluid 14 will always be present. Therefore the use of the protrusion 42 has a minimal effect on the contrast which may be provided by the display device, since the protrusion will not be placed in a portion of the display area which would have a switchable coverage of the first fluid. This is illustrated in FIG. 5C, where the first fluid 14 is shown collected around the protrusion 42.

The use of the protrusion 42 as described above is particularly suited to embodiments where electrodes are provided in the walls 18 and the hole 32 is provided spaced away from the walls. This is because, by having the protrusion contact the display area at a point spaced away from the walls, the tolerances used in aligning the first and second support plates can be relaxed.

The surface material of the protrusion 42 may be selected such that the first fluid 14 collects at the end of the protrusion near the first support plate, rather than the end near the second support plate. To achieve this, the surface material at the end of the protrusion 42 near the first support plate may be the same or similar to the surface material 22 present within the display area; that is hydrophobic. Equally the surface material at the end of the protrusion near the second support plate may be hydrophilic. The properties of the surface of the protrusion may be achieved by selective surface treatment of the whole, or part, of the protrusion 42. Alternatively, the material used to construct the protrusion may be selected to give the protrusion the appropriate properties. The protrusion may be reflective or light absorbing to enhance the optical properties of the display. In some embodiments the bottom or the top or both may be reflective or light absorbing.

In the embodiments described above, the electrode may be made of aluminum or another high reflective metal such silver. Alternatively Indium Tin Oxide (ITO), a transparent conductor may be used. In particular ITO is used if the application requires high transmittance of light, such as in transmissive, transparent or transflective display devices. However even in case of display devices where ITO is used as conductor in the display area, in some embodiments the side electrodes may be made from a reflective material, such as metal. The benefits of doing so are illustrated in FIG. 6.

One problem with electrowetting displays is that the spacing between the first and second support plates is relatively large. As such if color filters or lens arrangements are positioned on the second support plate and each of these elements form a pixel together with the display area 20, there may be a significant amount of light incident at non-zero angles that passes from one pixel to a neighboring pixel, thereby causing inter-pixel optical crosstalk. To reduce the amount of crosstalk, the electrodes in the side walls may be made reflective to provide a reflective portion in the side of the wall facing the display area 20. Thus more light associated with a given display area is kept within the display area. This use of reflective walls may be combined with using taller walls; that is walls which extend further into the space 12. This maximizes the containing effect.

Figure 6:
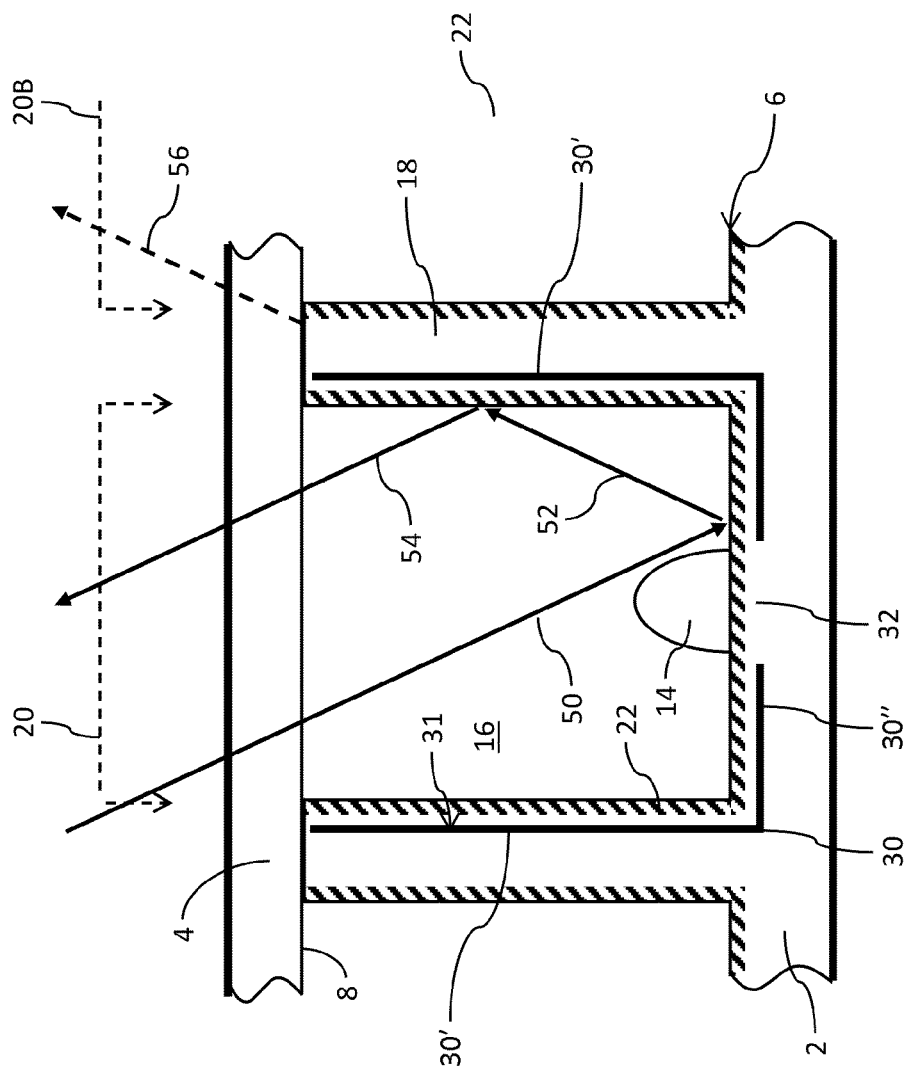
FIG. 6 shows a schematic diagram of a picture element according to yet another embodiment.

FIG. 6 shows a cross section similar to that shown in FIG. 3B. In FIG. 6, the walls extend so as to contact the second support plate 4. This increases the reflective surface, and thus the light containing effect of the picture element. The picture element is of a reflective type in that the display area is reflective for light incident through the second support plate. The first fluid 14 has been contracted at the hole 32. Arrow 50 shows incident light entering the display. The light is reflected off the display area, as shown by arrow 52, and subsequently off the reflective electrode 30' in the pixel wall. Thus the light, as shown by arrow 54, is kept within the area of the display associated with the display area 20. For comparison, dashed arrow 56 shows how the light would have passed into a neighboring display area 20B without the effect of the reflective wall.

Figure 7:
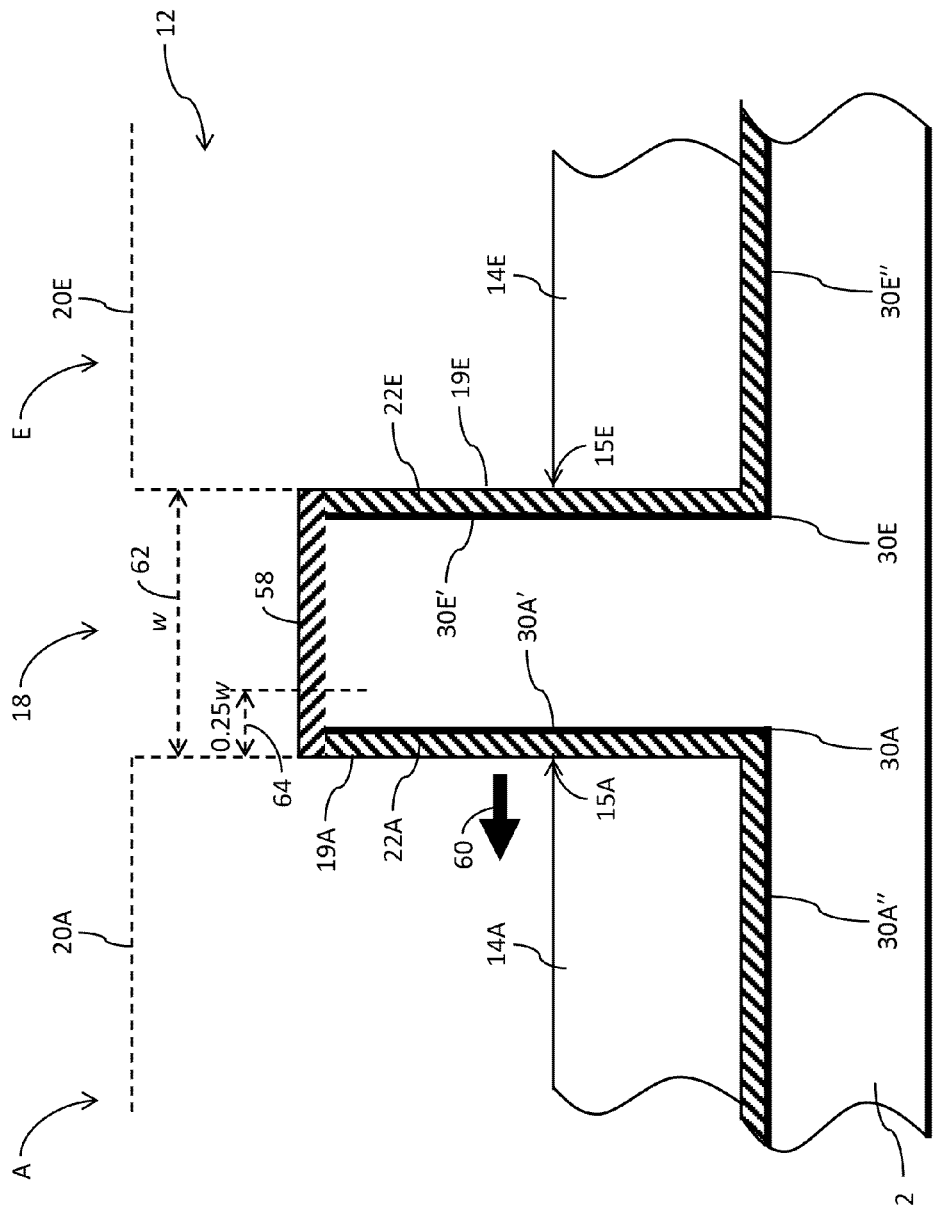
FIG. 7 shows a detailed view of a wall according to an embodiment.

FIG. 7 shows a close up view of the wall 18. Wall 18 is arranged between two neighboring picture elements, A and E. Each picture element has features such as described above in e.g. FIG. 3, each feature being provided with the same reference number and the suffix A for the first picture element or E for the second.

In FIG. 7, each picture element A and E, has a second portion 30A' and 30E' within the wall 18. These second portions 30A' and 30E' are adjacent to respective surfaces 19A and 19E of the wall 18. The second portions 30A' and 30E' are separated from the space 12 only by the layers of surface material 22A and 22E. This increases the effect of the second portions as it minimizes the spacing between the second portions and the first and second fluids.

In FIG. 7, a further surface layer 58 is shown on the top of the wall, that is the end of the wall facing the second support plate. This surface layer 58 may have different wettability properties than the surface material 22. For example the surface layer 58 may be hydrophilic, where the surface material 22 is hydrophobic. The surface layer may also serve to insulate the top of the second portion of the electrode, that is the end of the electrode nearest the second support plate, from the first fluid.

As can be seen, both the second portions of the electrodes 30A' and 30E', and the portions of the second surfaces 19A and 19E comprising the surface material 22A and 22E extend to substantially the height of the wall, and are separated from the very top of the wall by only the layer 58. However, it will be appreciated that the configuration of the surface material of the walls need not be as shown here, and that the surface material 22 may extend over the top of the wall. Alternatively, the surface layer 58 may extend at least a part of the way down surface 19A, i.e. down the side of the wall.

The cross section shows the second portions 30A' and 30E' of the electrode. It is apparent that the long side of a cross section of the second portions 30A' and 30E' faces the display areas 20A and 20E, as shown, for the case of display area A, by arrow 60. It is further apparent that the second portions 30A' and 30E' are within the volume created by projecting the second surfaces 19A and 19E along a line parallel to the arrow 60, this line being perpendicular to, or a normal of, the surfaces 19A and 19E.

The width of the wall w is shown by arrow 62. As the wall is formed along the perimeters of the display areas, the width of the wall is the distance between the edges of display areas of neighboring picture elements, in this case display areas 20A and 20E. A further arrow 64 identifies the distance of 0.25 w, that is 25% of the width of the wall, from the surface 19A. While it will be apparent that the second portions of the electrodes will typically be substantially closer to the surface 19A, this distance may be taken as an upper limit within which the electrode may be provided within the wall. When the electrode is within this distance, the electrode is sufficiently close to the side of the wall so as to be able to provide the desired effect, that of initiating movement of the first fluid away from the electrode.

The above arrangement can therefore be contrasted with known electrowetting display devices, such as one with a picture element in which a portion of an electrode is present within a wall. However it is to be noted that the electrode within the wall of the known device is neither adjacent to a surface 19, as in the present embodiments, nor has a surface including a long side of a cross section of the second portion facing the display area, as described above. Instead, in the known device, the surface of the portion of the electrode within the wall including a long side of a cross section of the portion faces a direction which is parallel to the perimeter of the display area, rather than towards the display area. Thus the portion of the electrode within the wall, in the known device, is unable to provide the desired display effect, since in the known device the first fluid is attracted towards, and collected near, the portion of the electrode within the wall.

In the embodiments described above, the first surface 6 of the picture element is substantially flat, i.e. on the same plane. Some existing picture elements may have a first surface 6 which is not flat. For example the first surface 6 may be formed so as to have a first and second layer at different heights, and a vertical, or substantially vertical section between them. Moreover, an electrode may be present adjacent to the first surface over these two layers, and over the vertical section between them.

However, it will be apparent that in these existing picture elements, the layers, and the vertical section are all contained within the display area. That is, they are contained within the area within which the first fluid is confined. By contrast, the second portions described above are present in a part of a wall formed outside of and along the perimeter of the display area, where the first fluid is constrained within the display area. Thus it will be apparent that the construction and effect of such non-flat display areas is distinct from embodiments described herein.

Some existing electrowetting devices have an electrode arranged within the side walls of a display area, adjacent to the equivalent of the second surface described above, and arranged such that a surface of the electrode including a long side of a cross section of the second portion faces the display area. However, such devices do not have any portion of the electrode being adjacent to the base of the display area, i.e. adjacent to the first surface as described above.

Moreover, it will be apparent that the combined teaching of a known electrowetting device with an electrode within the base of the display area and a known electrowetting device with an electrode within a wall does not result in embodiments described herein. Instead the combination may be regarded to teach an electrowetting device having an electrode in the base of the display area, another electrode in the wall, and a gap between the two electrodes. This gap would form a collection area for the first fluid, which is detrimental to the operation of the display device. The embodiments described herein do not have a gap between the electrode in the base and the electrode in the wall.

Figure 8:
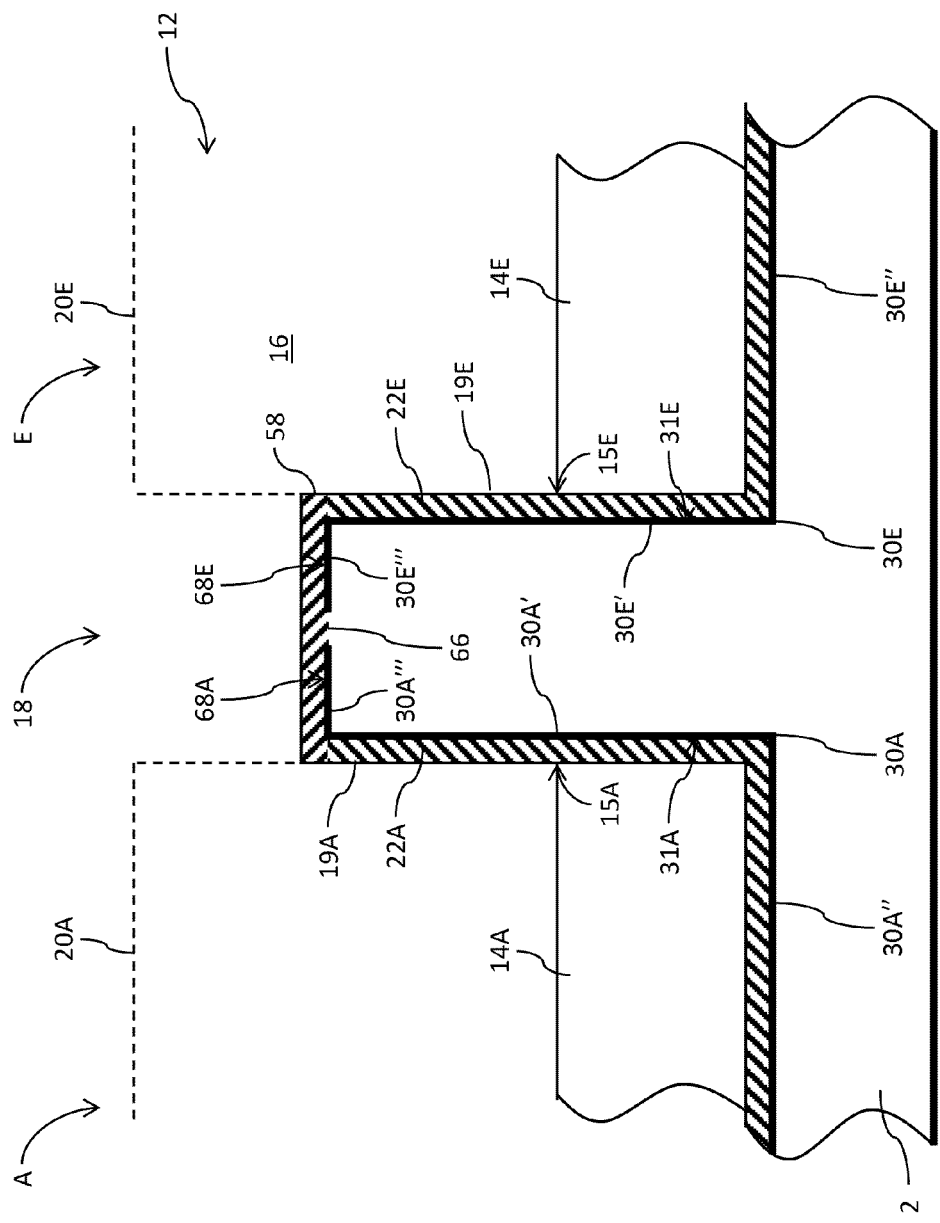
FIG. 8 shows a detailed view of a wall according to an embodiment.

FIG. 8 also shows a close up view of the wall 18, and illustrates an arrangement of the electrodes according to further embodiments. FIG. 8 shows many of the features shown in FIG. 7. These features have the same reference numerals, and will not be described in detail here.

As with FIG. 7 above, the electrodes 30A and 30E have first portions 30A" and 30E", and second portions 30A' and 30E' respectively. In addition, the electrodes have third portions 30A'" and 30E'". These third portions extend within a portion of the wall facing the surface 8 of the second support plate 4 (not shown in FIG. 8). In other words, for a given third portion, a surface of the third portion including a long side (68A, 68E) of a cross section of the third portion (30A'", 30E'") faces the surface 8 of the second support plate 4. Adjacent third portions, here 30A'" and 30E'" may be separated, as shown by gap 66. This ensures that the portions are electrically insulated from each other, to enable independent switching of the display areas. In addition, the third portions (30A'", 30E'") are separated, and therefore insulated, from the second fluid 16 by surface layer 58.

By extending the electrodes along the top of the wall, i.e. by providing a third portion, the electrodes may capacitively couple with the second fluid 16 within the space 12. The capacitance resulting from the capacitive coupling enables any capacitor used to maintain a charge on the electrode to be omitted, or at least be reduced in size. Alternatively, the capacitance may be used to increase the total capacitance.

The arrangement of third portions may be adapted depending on the desired configuration of the display. Equally, for different portions of wall the configuration of the electrode, or electrodes, may be different. For example, a given section of wall 18 may have second portions (shown as 30A' and 30E') from two electrodes (here 30A and 30E). In such an arrangement, the corresponding third portions (30A''' and 30E''') may both extend within the portion of the wall facing the surface 8 of the second support plate 4, as is shown in FIG. 8.

In alternative embodiments, or in a different portion of a wall, a third portion for one electrode may be substantially larger than a third portion of an adjacent electrode, to the extent that the third portion of the adjacent electrode may be omitted entirely. For example, the third portion 30E''' of electrode 30E may be omitted. In such embodiments, the third portion 30A''' of electrode 30A may extend across the width of the wall, excluding any insulation gap (i.e. gap 66) required to separate the electrodes. This latter arrangement may be used where the second portion 30E' of electrode 30E is omitted, such as in the embodiment shown in FIG. 2.

In embodiments, the surface layer 58 of the wall facing the surface 8 of the second support plate 4 may not be parallel with the plane of the surface 8 of the second support plate 4, and may be, for example, curved. In such cases, it will be apparent that the third portion of an electrode need not be parallel with the surface 8 of the second support plate 4, but may merely face the surface 8 of the second support plate 4.

While FIG. 8 shows an arrangement of electrodes similar to those in FIG. 3, a third portion as described above may be provided for any of the embodiments described above with reference to any of the other figures.

Process steps for constructing the relevant portions of the display device such as the display devices described above will now be described. The process is described using SU8 for the main structural features, Indium Tin Oxide (ITO) for the electrodes and AF1600 for the surface material 22. However, it will be apparent that other suitable materials may be used.

For a configuration having the first wall, i.e. the wall containing the second portion of the electrode, formed around the whole perimeter of the display area around, such as in FIG. 3, the following steps may be used:

1. Deposit SU8 on the first support plate substrate;
2. Perform a photolithography process on the SU8 to define the walls formed on the perimeters of the display areas;
3. Deposit ITO on display areas and on the sides of the walls facing the display areas—the ITO may also be deposited on the tops of the walls, that is on the surface facing the second support plate;
4. Perform a patterning process on the ITO to remove the ITO from on top of pixel walls and to form the hole;
5. Deposit hydrophobic material (AF1600) on top of the complete substrate, including the sides of the walls facing the display areas and hole area.

The above process will form a display device in which the second portion of the electrode 30' extends to substantially the height of the wall. Furthermore, in this process, the surface layer 58 as shown in FIG. 7 will be AF1600, as is the surface material 22 forming the surface of the walls and of the display area.

In some embodiments, the surface layer 58 may not be AF1600. As such any AF1600 deposited in the area given reference 58 may be removed by Reactive-ion etching, plasma treatment or deep UV.

For a configuration having discrete first walls, i.e. wherein the first wall does not form a complete perimeter of the display area, such as shown in FIGS. 2 and 4 there are 2 separate SU8 depositing steps. The procedure of constructing the display device may be as follows:

1. Deposit SU8 on the first support plate substrate;
2. Perform a first photolithography process on the SU8 to define the walls (e.g. height and location);
3. Deposit ITO on display areas and on the walls to the side of the display areas—the ITO will also be deposited on the tops of the walls, that is on the surface facing the second support plate;
4. Perform a patterning process on the ITO to remove the ITO from on top of pixel walls, from side walls where required, and to form the hole;
5. Deposit hydrophobic material (AF1600) on top of the complete substrate, including the walls and hole area;
6. Perform an etching process, such as Reactive Ion Etching (RIE) on the AF1600 layer to activate specific locations for further SU8 deposition.
7. Deposit SU8 on the first support plate substrate;
8. Perform a second photolithography process on the SU8 to define second pixel walls;
9. Reflow to get back the hydrophobic properties of AF and hard-bake the SU8.

In the above description the display area has been described as being rectangular. It will be understood that any particular polygon may be used for the display area. In addition, it will be apparent that the embodiments are applicable to other shapes of display areas, such as circles, lozenges, and any customized shape which might be used in a display—for example as one of the seven elements in a seven segment display.

The display area may have an elongated shape having the second portion of the electrode positioned at one end and a hole in the first portion positioned at another end. This arrangement provides more accurate control of the coverage of the first fluid over the display area. Therefore a more controllable display effect may be achieved. Alternatively, the display area may be elongated having the second portion of the electrode positioned along a substantial portion of one side and a hole present along the other side. In this arrangement, the display effect may be changed more rapidly.

In the embodiment shown in FIG. 6, the walls extend so as to contact the second support plate 4. It will be appreciated that such an arrangement may be used with any of the other embodiments described above.

It will be appreciated that the figures referred to herein are diagrammatical, and the size and shape of features is dictated by clarity rather than being representative of the features as they would appear in embodiments.

The above embodiments are to be understood as illustrative examples, and that further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising a picture element, the picture element comprising:
    a first support plate and a second support plate;
    a space between the first support plate and the second support plate comprising a first fluid and a second fluid immiscible with the first fluid;
    wherein the first support plate comprises:
        a display area, adjoining the space, within which the first fluid is confined, the display area having a first surface adjoining the space;
        a wall, protruding from the first support plate, formed outside the display area along at least a part of a perimeter of the display area, the wall having a second surface facing the display area and adjoining the space; and
        an electrode comprising at least a first portion and a second portion, the first portion being adjacent to the first surface and the second portion being adjacent to at least a part of the second surface, wherein a surface of the second portion including a long side of a cross section of the second portion faces the display area.

2. The electrowetting display device of claim 1, wherein the first surface and at least a section of the second surface are more wettable to the first fluid than to the second fluid, wherein the second portion of the electrode is adjacent to at least a part of the section of the second surface.

3. The electrowetting display device of claim 2, wherein the section of the second surface extends substantially to an interface line between the first fluid, the second fluid and the second surface when there is zero voltage between the electrode and the second fluid.

4. The electrowetting display device of claim 1, wherein the second portion of the electrode extends substantially to a position adjacent to an interface line between the first fluid, the second fluid and the second surface when there is zero voltage between the electrode and the second fluid.

5. The electrowetting display device of claim 1, wherein the perimeter of the display area forms a polygon and the second portion is adjacent to a part of the second surface which extends from at least a part of one side of the polygon.

6. The electrowetting display device of claim 1, wherein the perimeter of the display area forms a polygon and the second portion is adjacent to a part of the second surface which extends from at least a part of each of two sides of the polygon adjacent to a first corner of the polygon.

7. The electrowetting display device of claim 5, wherein the first portion comprises a hole arranged adjacent to a part of the polygon opposite the second portion.

8. The electrowetting display device of claim 6, wherein the first portion comprises a hole arranged adjacent to a part of the polygon opposite the second portion.

9. The electrowetting display device of claim 1, wherein the second surface and the second portion of the electrode are continuous around the perimeter of the display area.

10. The electrowetting display device of claim 9, wherein the first portion comprises a hole at a position adjacent to a part of the first surface spaced from the perimeter of the display area.

11. The electrowetting display device of claim 1, wherein the second support plate comprises a protrusion protruding towards the first support plate.

12. The electrowetting display device of claim 7, wherein the second support plate comprises a protrusion protruding from the second support plate, the protrusion being aligned with the hole in the first portion.

13. The electrowetting display device of claim 8, wherein the second support plate comprises a protrusion protruding from the second support plate, the protrusion being aligned with the hole in the first portion.

14. The electrowetting display device of claim 10, wherein the second support plate comprises a protrusion protruding from the second support plate, the protrusion being aligned with the hole in the first portion.

15. The electrowetting display device of claim 11, wherein the protrusion is configured to contact the first support plate.

16. The electrowetting display device of claim 11, wherein the protrusion comprises a third surface, at an end of the protrusion near the first support plate, the third surface being more wettable to the first fluid than to the second fluid.

17. The electrowetting display device of claim 16, wherein the protrusion comprises a fourth surface, at an end of the protrusion near the second support plate, the fourth surface being less wettable to the first fluid than the third surface.

18. The electrowetting display device of claim 1, wherein the wall extends so as to contact the second support plate.

19. The electrowetting display device of claim 1, wherein the wall comprises a reflecting portion on a side facing the display area.

20. The electrowetting display device of claim 19, wherein the second portion of the electrode forms the reflecting portion.

21. The electrowetting display device of claim 1, wherein, with a zero voltage between the second fluid and the electrode, the first surface is at least one of:
    less wettable to the second fluid that to the first fluid; or
    hydrophobic.

22. The electrowetting display device of claim 1, wherein, with a zero voltage between the second fluid and the electrode, the first fluid adjoins at least part of the first surface.

23. The electrowetting display device of claim 22, wherein, with a non-zero voltage between the second fluid and the electrode, the first fluid adjoins part of the first surface.

24. The electrowetting display device of claim 22, wherein the first fluid is substantially electrically non-conductive.

25. The electrowetting display device of claim 1, wherein the at least a part of the second surface of the wall is adjacent to the second portion of the electrode with a zero voltage between the second fluid and the electrode.

* * * * *